United States Patent
Heismann et al.

(10) Patent No.: US 7,081,627 B2
(45) Date of Patent: Jul. 25, 2006

(54) IMAGE DETECTOR FOR X-RAY RADIATION

(75) Inventors: Bjoern Heismann, Erlangen (DE); Juergen Leppert, Forchheim (DE); Thomas Von Der Haar, Nuernberg (DE)

(73) Assignee: Siemens Aktiengesellschaft, Munich (DE)

( * ) Notice: Subject to any disclaimer, the term of this patent is extended or adjusted under 35 U.S.C. 154(b) by 203 days.

(21) Appl. No.: 10/667,466

(22) Filed: Sep. 23, 2003

(65) Prior Publication Data

US 2004/0113085 A1  Jun. 17, 2004

(30) Foreign Application Priority Data

Sep. 23, 2002 (DE) ................. 102 44 176

(51) Int. Cl.
*G01T 1/24* (2006.01)
(52) U.S. Cl. ............... 250/370.11; 250/370.09
(58) Field of Classification Search ......... 250/332, 250/339.02, 370.11, 370.08, 370.09, 368, 250/363.01, 361 R; 378/19
See application file for complete search history.

(56) References Cited

U.S. PATENT DOCUMENTS

| | | | | |
|---|---|---|---|---|
| 4,709,382 A * | 11/1987 | Sones | ............................ | 378/62 |
| 5,099,128 A * | 3/1992 | Stettner | ................. | 250/370.11 |
| 5,138,167 A * | 8/1992 | Barnes | ................... | 250/370.01 |
| 5,981,950 A * | 11/1999 | Wolny et al. | ............. | 250/338.4 |
| 6,069,361 A * | 5/2000 | Rubinstein | ............. | 250/370.11 |
| 6,285,029 B1* | 9/2001 | Shahar et al. | .......... | 250/370.14 |
| 2002/0017612 A1* | 2/2002 | Yu et al. | ................. | 250/370.11 |
| 2002/0027201 A1* | 3/2002 | Agano | .................... | 250/370.11 |

FOREIGN PATENT DOCUMENTS

WO    99/09603    2/1999

* cited by examiner

*Primary Examiner*—David Porta
*Assistant Examiner*—Faye Polyzos
(74) *Attorney, Agent, or Firm*—Harness, Dickey & Pierce, P.L.C.

(57) ABSTRACT

An image detector is for detecting electromagnetic radiation, in particular X-ray radiation. It includes a carrier layer and a photosensor carried by the carrier layer. Each of the carrier layer and photosensor both have a nonvanishing transparency to the electromagnetic radiation. The image detector includes two or more carrier layers and photosensors carried thereby, arranged one above the other, so that the electromagnetic radiation can pass through them one after the other.

30 Claims, 1 Drawing Sheet

IMAGE DETECTOR FOR X-RAY RADIATION

The present application hereby claims priority under 35 U.S.C. §119 on German patent application number DE 102 44 176.6 filed Sep. 23, 2002, the entire contents of which are hereby incorporated herein by reference.

FIELD OF THE INVENTION

The invention generally relates to an image detector for an X-ray device.

BACKGROUND OF THE INVENTION

Imaging in X-ray diagnosis requires image detectors which make it possible to record and visualize X-ray radiation. Image detectors that are in widespread use are films sensitive to X-rays, which are exposed by the impinging X-ray radiation and have to be developed in order to generate an image after the exposure.

In the course of general image digitization, but in particular also with regard to computer tomography, there is increasingly a demand for image detectors which allow digital images to be generated without a circuitous route via a conventional film recording. In order to ensure a corresponding image resolution, they have to be embodied with a large area and with many lines or many pixels.

In computer tomography, use is made for this purpose of photodiodes which detect the radiation from scintillators which are structured in a complicated manner and convert the X-ray radiation into a radiation of changed wavelength. In other imaging methods, use is also made of a-Si diodes, so-called FD diodes, which detect the radiation of so-called luminescent material layers based on cesium iodide and titanium. Moreover, semiconductor detectors are also known in which the X-ray radiation itself can be detected directly, that is to say without any prior change to the wavelength by a luminescent material layer. FD diode detectors, scintillator detectors and semiconductor detectors have to be structured in a complicated manner. As a result, the known image detectors are complicated in their construction and expensive to produce. Furthermore, they do not permit energy-resolved detection of the X-ray radiation.

An image detector which is less complicated to produce and is thus less expensive is based on the use of organic photodiodes. A diode of this type is proposed in WO 99/09603 in order to provide an inexpensive alternative, which can be produced with a large area, to conventional inorganic-based image detectors. In that case it is presupposed that the radiation sensitivity of organic photodiodes is sufficient to be able to produce image detectors for both color and black/white images. What is proposed for the detection of such images is an organic-based photodiode whose light sensitivity can be controlled by the application of an electrical voltage. While the sensitivity of the diode proposed is sufficient for visible light, this is not the case for X-ray radiation. Moreover, the sensitivity cannot be increased sufficiently by the use of luminescent material layers.

SUMMARY OF THE INVENTION

Therefore, an embodiment of the present invention has set itself an aim of providing an image detector which can be produced cost-effectively and at the same time has a sufficient sensitivity to X-ray radiation in order to be suitable for application in X-ray diagnosis.

An embodiment of the invention achieves this aim by way of an image detector.

A concept of an embodiment of the invention resides in using, instead of an individual photosensor, a multiplicity of such sensors which are stacked in the image detector. The stack is arranged in such a way that the X-ray radiation to be detected can pass through a plurality of photosensors situated one after the other, thereby increasing the detection probability. This makes it possible for an X-ray quantum that is not detected by the first photosensor on which it impinges to be detected on its further path through the second or third photosensor situated after that. In order to generate a spatial image of the impinging X-ray radiation, each layer of the stack may contain a plurality of photosensors arranged in spatially distributed fashion.

One advantageous variant of an embodiment of the invention results if each layer of the stack carries spatially distributed photosensors which are arranged directly below or above the individual photosensors of the underlying or overlying stack layers. The columns of photosensors lying one above the other can then be jointly interrogated in each case in order to obtain a detection signal for the corresponding location or pixel.

A further advantageous variant of an embodiment of the invention resides in arranging the spatially distributed photosensors randomly on the individual stack layers. Overlapping with the photosensors of the respectively overlying or underlying stack layer is thus random as well. In order nevertheless to enable a spatially resolved detection, only those photosensors lying one above the other which have a mutual overlap have to be determined in this variant. The determination of photosensors lying one above the other and the joint evaluation of the detection signals thereof is a task that a computer can accomplish comparatively simply and the advantage afforded is that the structuring of the individual stack layers and the mutual arrangement of the stack layers is very uncomplicated and production turns out to be very cost-effective as a result. In this case, it is necessary merely to impose the requirement that the area of the individual photosensors is sufficiently small in relation to the desired spatial resolution of the image detector.

A further, additional advantage of an embodiment of the invention is that the stacks of photosensors lying one above the other allow an energy-resolved detection of the X-ray radiation. In this case, the information about the energy of the X-ray radiation is contained in the penetration depth into the stack of photosensors.

A particularly advantageous variant of an embodiment of the invention results if organic photodiodes are used as photosensors. Organic diodes are uncomplicated to produce and structure. Their flexibility means that they exhibit particularly good adaptability to different detector geometries.

BRIEF DESCRIPTION OF THE DRAWINGS

The present invention will become more fully understood from the detailed description of preferred embodiments given hereinbelow and the accompanying drawings which are given by way of illustration only, and thus are not limitative of the present invention, and wherein.

DETAILED DESCRIPTION OF THE PREFERRED EMBODIMENTS

Figure 1:
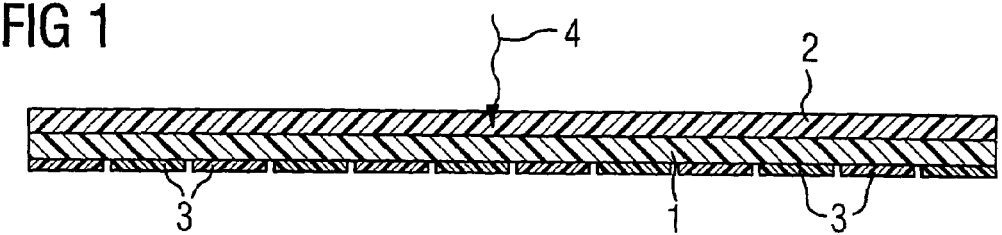
FIG. 1 illustrates a single-layer image detector according to the prior art.

FIG. 1 illustrates an X-ray image detector according to the prior art. A luminescent material layer 2 is applied on the carrier film 1. The radiation 4 to be detected excites said luminescent material layer to emit radiation of a changed wavelength. Organic photosensors 3, in this case photodiodes, are applied on the other side of the carrier film 1 and are able to detect the radiation emitted by the luminescent material layer 2.

The organic photodiodes 3 operate as active image detectors, i.e. upon excitation by radiation they liberate charge carriers which are then detected directly. Thus, a detection always take place directly at the point in time when radiation occurs. Active image detectors are thus unlike passive image detectors such as CCDs (charge coupled device), which, having been excited by radiation, liberate charge carriers and store them until the charge carrier stores are read. The function of CCDs is based on a specially adapted semiconductor band model realized using inorganic semiconductor materials. The charge carriers are read out register by register, e.g. with one channel per detector row, which necessitates a complicated construction which enables only a comparatively slow read-out of images.

The electrical contact connection required for reading the individual photodiodes 3 of an embodiment of the invention is not specifically illustrated in FIG. 1 but it is evident, however, that owing to the absence of registers and charge carrier stores, each photodiode 3 must be provided with at least one dedicated electrical contact in order to be able to be read individually. One variant of an embodiment of the invention provides for the second electrical contact of each photodiode 3 which is required for the read-out to be common to all the photodiodes 3. For this purpose, by way of example, the carrier film 1 in addition to its mechanical function as carrier or the luminescent material layer 2 may fulfill an additional, electrical function as common contact for all the photodiodes 3. To that end, either the respective film is to be produced from conductive material or the boundary layer with respect to the photodiodes 3 is to be provided with a conductive surface, e.g. with a layer of transparent, conductive indium-doped tin oxide (ITO).

Particularly simple processing is made possible by the carrier film 1 and likewise the photodiodes 3 being produced from organic material, since it is then flexible and can be connected to the organic photodiodes 3 in a simple manner. Depending on the requirement, however, the carrier film 1 may also be produced from inorganic semiconducting materials, such as silicon. The carrier film 1 must in any event be sufficiently transparent to allow the radiation to pass through to the photodiodes 3.

In order to enable a spatially resolved image detection, the photodiodes 3 are arranged in a manner distributed either linearly or two-dimensionally on the carrier film 1. The degree of spatial resolution results from the size of the individual photodiodes 3, while the degree of absorption is essentially determined by the luminescent material layer. Depending on the method for producing the image detector, the photodiodes 3 may be arranged uniformly, e.g. as a matrix, on the carrier layer, or randomly. Depending on this, different requirements are made of the electrical contact connection and the structuring of the photodiodes 3 as a result.

Figure 2:
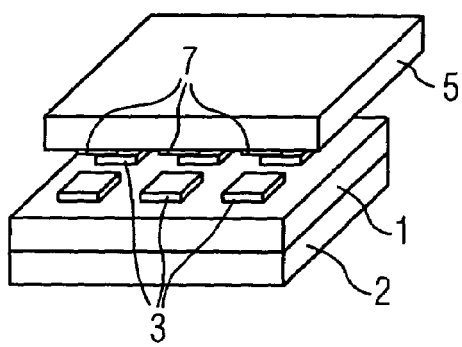
FIG. 2 illustrates a matrix-like spatial arrangement of photodiodes.

FIG. 2 shows a matrix-like arrangement of the photodiodes 3. Given such an arrangement, an electrical contact structure identical to the photodiode structure with an identical matrix-like arrangement will be chosen. The electrical contact structure is based on a contact carrier layer 5 on which the electrical contacts 7 are thus likewise arranged in a matrix-like manner and are situated opposite the photodiodes 3, so that each contact 7 makes contact with precisely one photodiode 3. The identically arranged photodiodes 3 and electrical contacts 7 then lie congruently one above the other, so that each photodiode 3 is connected to an electrical contact 7.

Figure 3:
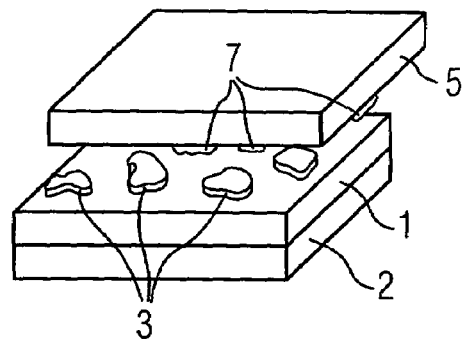
FIG. 3 illustrates a random spatial arrangement of photodiodes.

FIG. 3 shows a random arrangement of the photodiodes 3. Given such an arrangement, an electrical contact structure is chosen which is similar to the photodiode structure and is likewise subject to random chance. The electrical contact structure is based on a contact carrier layer 5 on which electrical contacts 7 are arranged randomly in the same way as the photodiodes 3. This is because it would be inconceivable to simulate the random spatial arrangement of the photodiodes 3 in a targeted manner in order to be able to make contact individually with the photodiodes 3. Instead, a contact structure is chosen in a random arrangement but with structural elements of approximately the same size as in the photodiode structure. Thus, in principle, the electrical contact structure looks exactly like the photodiode structure and situated opposite it.

The mutual overlap of photodiodes 3 and contacts 7 is purely random and it is likewise left to random chance as to which photodiode 3 is connected to which contact 7. It is conceivable for in some instances a plurality of photodiodes 3 to be jointly contact-connected by a single contact 7 and in some instances individual photodiodes 3 not to be contact-connected at all. The spatial resolution then depends not only on the size of the photodiodes 3 but also on the structure of the electrical contacts 7. It is evident that the photodiodes 3 must have significantly smaller dimensions than the individual pixels in the desired spatial resolution.

It would also be possible for the photodiodes 3 not to be structured but rather to be applied as a continuous layer. The individual detector points would then be predetermined solely by the structure of the electrical contacts 7, which could be configured e.g. in matrix-like or random fashion as explained in the preceding FIGS. 2 and 3. Each electrical contact 7 would then represent a detector point and thus a pixel. In the case of such structuring, the charge carriers generated by detection events in the photodiode 3 would be detected in each case by the electrical contact 7 located the nearest.

Figure 4:
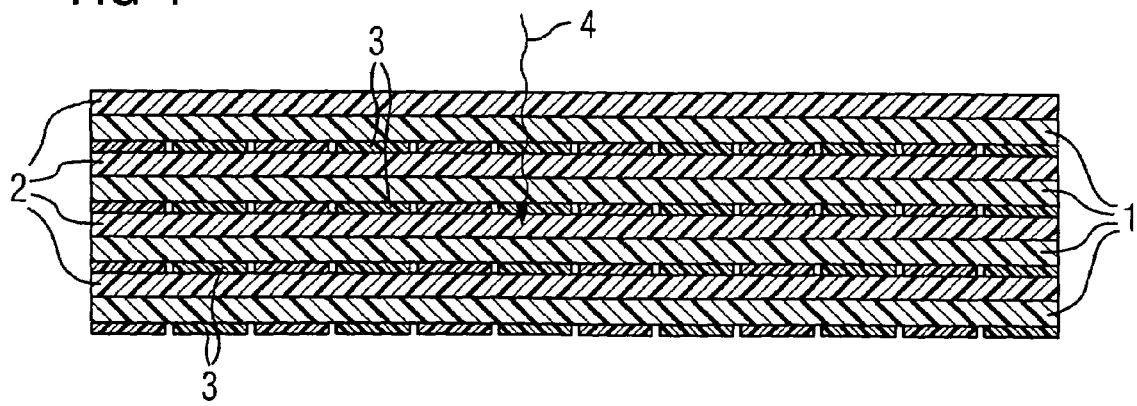
FIG. 4 illustrates a multilayer image detector according to an embodiment of the invention.

FIG. 4 shows an X-ray image detector according to an embodiment of the invention, which includes a stack of detector films as illustrated in the preceding FIGS. 1, 2, 3. The stack of films illustrated comprises a sequence of a luminescent material layer 2, a carrier film 1, a plane of organic photosensors 3, in this case photodiodes, then once again a luminescent material layer 2, etc . . . It can be produced by known production methods such as printing, lamination or casting methods. The detector film stack is oriented in such a way that the radiation 4 be detected can pass through the individual detector films of the stack one after the other. In each of the detector films passed through, the radiation 4 is either detected or passes through the detector film. The probability of the radiation 4 being detected thus increases with the number of stacked detector films. As a result, the detection probability is e.g. doubled when using two detector films, tripled when using three detector films; the detection probability essentially increases by the same factor as the number of layers of the detector film stack.

In order that the detector film stack can be utilized as described, the individual films of the stack must be sufficiently transparent to the radiation 4 to be detected. Thus, on the one hand, it is necessary to use sufficiently transparent materials for the luminescent material layer 2, for the carrier film 1 and for the photodiodes 3 and, on the other hand, care must be taken to ensure that the boundary layers between the individual film constituents and the adjacent films are likewise sufficiently transparent. In order to avoid instances of scattering and reflection of the radiation 4 to be detected and thus to ensure a high detection probability and an exact spatial resolution, it is necessary to adapt the surface quality and the refractive indices of the materials to the material boundary layers in the film stack. The surface should be smoother, the greater the difference in the refractive indices of the adjoining layers.

By using the detector film stack described, it is simultaneously possible to achieve a high spatial resolution with a high detection probability, the so-called quantum utilization. In this case, the spatial resolution depends on the film layer thickness since the quanta of radiation, when passing through the film, are deflected more frequently, the farther they pass through the film. The absorption probability likewise depends on the film layer thickness since the detection of a quantum becomes more probable, the farther the distance it has to cover in the film. It furthermore depends on the luminescent material, too, since a quantum must bring about the luminescence thereof in order to be able to be detected. The detection probability therefore increases as the density of the luminescent material increases and as the number of luminescent material layers 2 increases.

Furthermore, the detector film stack described also permits an energy-resolved detection of the radiation 4. The energy information is determined by evaluating signals of the individual detector films of the stack. In this case, the energy information is contained in the penetration depth of the radiation 4 into the detector film stack. The more energy the radiation 4 to be detected has, the deeper it can penetrate into the film stack because it does not lose its energy all at once as a result of excitations in the detector film stack, but rather only gradually. The number of detection events and the depth of the detection events in the film stack therefore increase as the energy of the radiation 4 to be detected increases. The type of detector used, whether it be a-Si, organic or semiconductor, is unimportant in this case.

The photodiode layers have a thickness of a few to some 100 nm, approximately between a minimum of 300 nm and a maximum of 10 000 nm. The layer thicknesses are dimensioned such that the magnitude of the electrical signals from each layer is approximately the same. This facilitates the spectral analysis of the detected radiation with regard to determining density $\rho$ and ordinal number Z of the object examined. In order to achieve this, the absorption probability must be lower in the layers through which the radiation passes first, and higher in the layers passed through later, because the intensity of the radiation gradually decreases with each absorption event when passing through the stack.

The absorption probability can be increased on the one hand by increasing the thickness of the luminescent material layers 2 and on the other hand by increasing the thickness of the photodiode layers 3. Therefore, the thickness of at least one of the two layers increases with increasing distance from the image source, that is to say in the order in which the radiation to be detected passes through them. If the detector has no luminescent material layers 2, the thickness of the photodiode layers 3 must necessarily increase. What is thereby achieved is that the thinner layers are illuminated by more intensive X-ray radiation and conversely the thicker layers are illuminated by less intensive X-ray radiation, and that the radiation portions absorbed in each layer are of approximately the same magnitude. Instead of the thickness, however, it is also possible to vary the layer materials in such a way that the absorption probability increases, e.g. through an increasing density or increasingly sensitive light-emitting diode or photodiode materials.

The layer thicknesses that are actually to be chosen emerge in a known manner depending on the material of the luminescent material layers 2 and on the primary spectrum of the X-ray source.

In addition to the possibility of influencing the degree of absorption and the signal level generated in a manner dependent on detection events by way of the layer thickness, the configuration of the layers can also be altered supplementarily or as an alternative thereto. To that end, the detection sensitivity of the layer materials must increase in the order in which the radiation to be detected passes through them.

Each photodiode layer detects, in spatially resolved fashion, the light of the overlying luminescent material or scintillator layer. For medical applications, the total absorption by detection should be at least 95% of the incident X-ray radiation.

The currents of the photodiodes 3 are either passed laterally out of the layer stack or subjected to AID conversion below each individual photodiode 3 in a radiation-insensitive electronic layer. In both embodiments it is necessary to provide lateral contacts, which carry analog signals in one case and digital signals in the other case.

The luminescent material layers 2 are embodied as scintillator layers e.g. made of GdOS or ZnSE in ceramic or powder form. The powder-based embodiment would enable greater flexibility of the layer stack.

A microprocessor is used for the evaluation of the signals of the photodiodes 3 in the film stack. The microprocessor must firstly be fed the signals from photodiodes 3 lying one above the other in the film stack. If the photodiodes 3 of the individual films are arranged uniformly, e.g. in matrix form, then a spatially resolved detection signal is obtained by joint evaluation of the photodiodes 3 lying directly above one another. By contrast, if the photodiodes 3 are arranged randomly on the films, it is possible, on the one hand, for the electrical contact connection of the individual photodiodes 3 to be effected within uniform areas of photodiodes 3, that is to say for the electrical contacts to be arranged uniformly, e.g. in matrix form.

The spatially resolved detection signal is then obtained from contacts lying one above the other. The number of photodiodes 3 sensed by each electrical contact is random in this case. Furthermore, with a random arrangement of the photodiodes 3 on the films, each photodiode 3 can be contact-connected individually. It is then necessary to carry out a calibration in which photodiodes 3 lying one above the other are determined in order subsequently to be able to be jointly evaluated. For this purpose, it is possible, by way of example, to detect which contacts respond to an individual focused test beam perpendicular through the film stack. The assignment of the individual contacts to a column—to be jointly evaluated—of contacts lying one above the other and thus also photodiodes 3 is then stored in the memory of the microprocessor system. In an advantageous manner, energy-resolved measurements can equally be effected in spatially resolved fashion.

While the evaluation of the data for the actual image generation is always effected in the microprocessor, the assignment of photodiodes 3 lying one above the other to groups that are to be jointly evaluated, which in each case represent dedicated spatially resolved detection signals, can be effected either in the microprocessor or in electronic hardware provided especially for this purpose. The detection signals which have been combined by the electronic hardware in this way are then once again evaluated in the microprocessor.

An embodiment of the invention can also be realized using photosensors other than photodiodes. Depending on the property of the photosensor to be used, a changed construction of the film stack may result in this case; in particular, no luminescent material layer would be used when using a semiconductor detector.

An embodiment of the invention described enables the cost-effective production of an image detector having a high detection probability, which furthermore offers the possibility of energy-resolving measurements. The image detector is preferably constructed using organic photodiodes completely in film technology. The advantages of organic diodes can be excellently combined with the advantages of the stack construction according to an embodiment of the invention.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image detector for detecting electromagnetic radiation, comprising:
   at least two carrier layers; and
   a photosensor, carried by each of said at least two carrier layers, wherein
      each carrier layer and photosensor include a nonvanishing transparency to the electromagnetic radiation, and
      said at least two carrier layers and corresponding photosensors are stacked alternately forming a single multilayer image detector in which electromagnetic radiation is passable through said at least two carriers and photosensors photosensors one after the other.

2. The image detector as claimed in claim 1, wherein each carrier layer carries a plurality of photosensors, arranged spatially on a respective carrier layer, wherein the plurality of photosensors are adapted to generate electrical signals in a manner dependent on the detection of electromagnetic radiation, and wherein the plurality of photosensors are jointly electrically contact-connected at least one of individually and within individual areas, so that the electromagnetic radiation is adapted to be detected in spatially resolved fashion.

3. The image detector as claimed in claim 2, wherein the at least one of individual photosensors and photosensor areas of each carrier layer are arranged at least one of congruently and in overlapping fashion at least one of above and below the at least one of individual photosensors and photosensor areas of the other carrier layers.

4. The image detector as claimed in claim 3, wherein organic photodiodes are used as photosensors.

5. The image detector as claimed in claim 3, further comprising:
   at least one luminescent material layer, including a nonvanishing transparency to the electromagnetic radiation; wherein
      the at least one luminescent material layer is adapted to output a radiation of changed wavelength upon being excited by the electromagnetic radiation, the radiation of changed wavelength being detectable by the photosensors.

6. The image detector as claimed in claim 5, wherein at lest one of the at least one luminescent material layer and one of the at least two carrier layers form a common electrical contact for adjoining photosensors.

7. The image detector as claimed in claim 3, wherein at least one of the layer thicknesses and layer materials of the individual planes of photosensors are varied in such a way that all the planes of photosensors are adapted to generate detection signals of approximately identical magnitude if the electromagnetic radiation passes through them one after the other.

8. The image detector as claimed in claim 3, wherein the layer thicknesses of the photosensors increase in the order in which the electromagnetic radiation is adapted to pass through them.

9. The image detector as claimed in claim 2, wherein the at least one of individual photosensors and photosensor areas of each carrier layer are arranged randomly, so that the at least one of photosensors and photosensor areas which are arranged randomly at least one of above and below the at least one of photosensors and photosensor areas of other carrier layers are jointly utilizeable for the spatially resolved detection of the radiation to be detected.

10. The image detector as claimed in claim 9, wherein organic photodiodes are used as photosensors.

11. The image detector as claimed in claim 9, further comprising:
    at least one luminescent material layer, including a nonvanishing transparency to the electromagnetic radiation; wherein
       the at least one luminescent material layer is adapted to output a radiation of changed wavelength upon being excited by the electromagnetic radiation, the radiation of changed wavelength being detectable by the photosensors.

12. The image detector as claimed in claim 11, wherein at lest one of the at least one luminescent material layer and one of the at least two carrier layers form a common electrical contact for adjoining photosensors.

13. The image detector as claimed in claim 9, wherein at least one of the layer thicknesses and layer materials of the individual planes of photosensors are varied in such a way that all the planes of photosensors are adapted to generate detection signals of approximately identical magnitude if the electromagnetic radiation passes through them one after the other.

14. The image detector as claimed in claim 9, wherein the layer thicknesses of the photosensors increase in the order in which the electromagnetic radiation is adapted to pass through them.

15. The image detector as claimed in claim 2, wherein organic photodiodes are used as photosensors.

16. The image detector as claimed in claim 2, further comprising:
    at least one luminescent material layer, including a nonvanishing transparency to the electromagnetic radiation;
       wherein the at least one luminescent material layer is adapted to output a radiation of changed wavelength upon being excited by the electromagnetic radiation, the radiation of changed wavelength being detectable by the photosensors.

17. The image detector as claimed in claim 16, wherein at lest one of the at least one luminescent material layer and one of the at least two carrier layers form a common electrical contact for adjoining photosensors.

18. The image detector as claimed in claim 2, wherein at least one of the layer thicknesses and layer materials of the individual planes of photosensors are varied in such a way that all the planes of photosensors are adapted to generate detection signals of approximately identical magnitude if the electromagnetic radiation passes through them one after the other.

19. The image detector as claimed in claim 2, wherein the layer thicknesses of the photosensors increase in the order in which the electromagnetic radiation is adapted to pass through them.

20. The image detector as claimed in claim 1, wherein organic photodiodes are used as photosensors.

21. The image detector as claimed in claim 1, further comprising:
at least one luminescent material layer, including a nonvanishing transparency to the electromagnetic radiation, wherein
the at least one luminescent material layer is adapted to output a radiation of changed wavelength upon being excited by the electromagnetic radiation, the radiation of changed wavelength being detectable by the photosensors.

22. The image detector as claimed in claim 21, wherein at lest one of the at least one luminescent material layer and one of the at least two carrier layers form a common electrical contact for adjoining photosensors.

23. The image detector as claimed in claim 1, wherein at least one of the layer thicknesses and layer materials of the individual planes of photosensors are varied in such a way that all the planes of photosensors are adapted to generate detection signals of approximately identical magnitude if the electromagnetic radiation passes through them one after the other.

24. The image detector as claimed in claim 1, wherein the layer thicknesses of the photosensors increase in the order in which the electromagnetic radiation is adapted to pass through them.

25. The image detector as claimed in claim 1, wherein the image detector is for detecting X-ray radiation.

26. An image detector for detecting electromagnetic radiation, comprising:
a plurality of stacked carrier layers, each carrier layer including at least one photosensor; wherein
each carrier layer and photosensor includes nonvanishing transparency to the electromagnetic radiation, and
the plurality of carrier layers are stacked on one another to form a single multilayer image detector, such that the electromagnetic radiation is passable therethrough, one after another.

27. The image detector as claimed in claim 26, wherein the image detector is for detecting X-ray radiation.

28. The image detector as claimed in claim 26, wherein each layer includes a plurality of photosensors, arranged spatially on a respective layer, wherein the plurality of photosensors are adapted to generate electrical signals in a manner dependent on the detection of electromagnetic radiation, and wherein the plurality of photosensors are jointly electrically contact-connected at least one of individually and within individual areas, so that the electromagnetic radiation is adapted to be detected in spatially resolved fashion.

29. The image detector as claimed in claim 28, wherein the at least one of individual photosensors and photosensor areas of each layer are arranged at least one of congruently and in overlapping fashion at least one of above and below the at least one of individual photosensors and photosensor areas of the other layers.

30. The image detector as claimed in claim 28, wherein the at least one of individual photosensors and photosensor areas of each layer are arranged randomly, so that the at least one of photosensors and photosensor areas which are arranged randomly at least one of above and below the at least one of photosensors and photosensor areas of other layers are jointly utilizeable for the spatially resolved detection of the radiation to be detected.

* * * * *